United States Patent [19]

Graham

[11] 4,129,285
[45] Dec. 12, 1978

[54] CHAIN AND TIGHTENING BINDER ASSEMBLY

[76] Inventor: John P. Graham, P.O. Box 37, Fort Gaines, Ga. 31751

[21] Appl. No.: 779,274

[22] Filed: Mar. 18, 1977

[51] Int. Cl.² .................. B60P 7/06; B61D 47/00; B66F 3/00; F16G 13/04
[52] U.S. Cl. .................. 254/78; 24/68 CT; 24/69 T; 59/78; 59/84; 105/469; 105/477; 256/37; 280/179 A
[58] Field of Search ............ 24/69 T, 68 CT, 16; 59/78, 80, 84; 105/469, 477; 152/222, 229, 230, 247; 160/328; 254/74, 75, 78, 81; 256/35, 37; 280/179 A; 292/246, 247; 403/206

[56] References Cited

U.S. PATENT DOCUMENTS

| 444,075 | 1/1891 | Reed | 254/81 |
|---|---|---|---|
| 448,862 | 3/1891 | Johnson | 254/78 |
| 567,323 | 9/1896 | Steinmetz | 59/84 |
| 1,523,565 | 1/1925 | Smith | 254/78 |
| 2,716,280 | 8/1955 | Ruhe | 59/78 |
| 3,271,007 | 9/1966 | Ratcliff | 254/78 |

FOREIGN PATENT DOCUMENTS 2159 4/1890 Sweden .......................... 59/84

Primary Examiner—Albert J. Makay
Assistant Examiner—Howard Beltran
Attorney, Agent, or Firm—George H. Baldwin; Arthur G. Yeager

[57] ABSTRACT

A chain for binding logs on a transport platform may be fabricated from a plurality of sequentially connected generally planar links, each link having laterally directed, log-penetrating extensions mounted to its external sides and having an elongated member with two log-penetrating ends rigidly mounted between the sides of the link normal to the plane of the link. A combination of the chain with an over-center binder attached to said chain and having a chain-engageable first end is also disclosed.

8 Claims, 5 Drawing Figures

U.S. Patent  Dec. 12, 1978  4,129,285
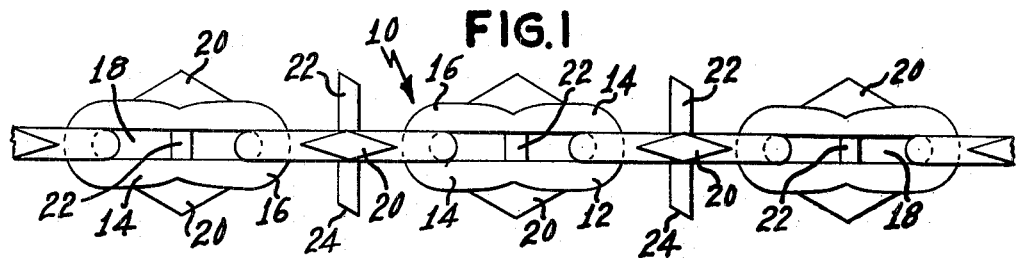
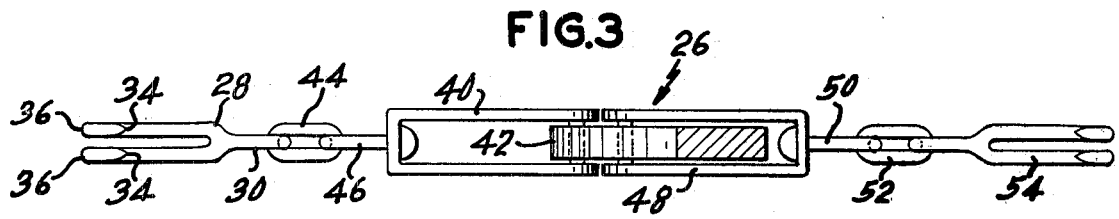
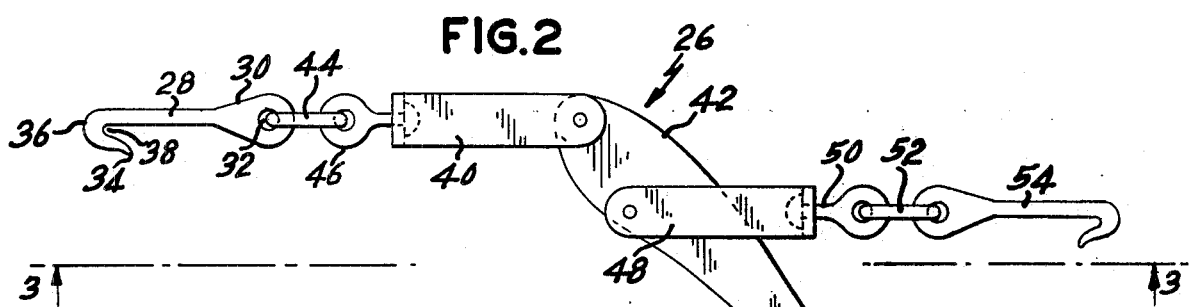
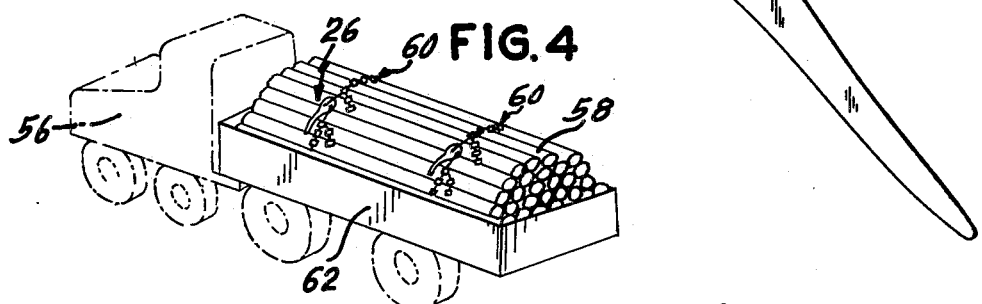
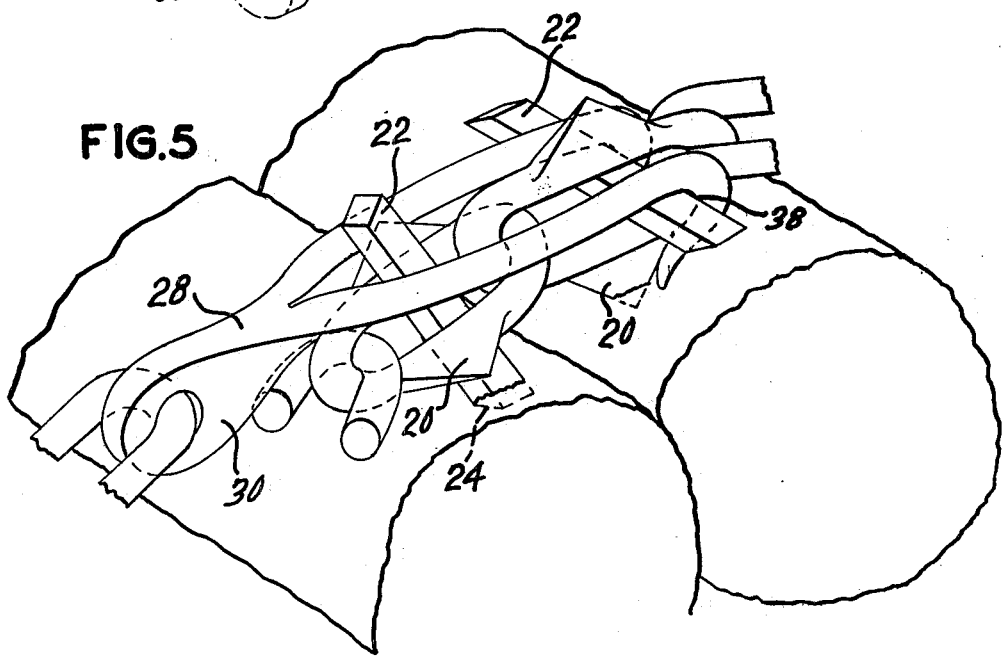

CHAIN AND TIGHTENING BINDER ASSEMBLY

BACKGROUND OF THE INVENTION

This invention relates generally to load stabilizing mechanisms for use in the logging industry and particularly to a chain for the prevention of slippage of logs on a transport platform.

As is well known to those skilled in the logging industry, trees are harvested and transported to processing facilities for use in a number of diverse industries, among which industries are the pulp wood industry and the lumber industry. Logs for use in the pulp wood industry are generally cut into lengths of from 5 to 8 feet at the logging site, and the logs so cut are piled in sections on a logging truck with their lengths transverse to the bed of the truck. In practice, a so-called bob-tail truck will accept two such piles or sections, while longer trucks such as tandems or tractor-trailers may accept as many as five sections.

Logs for use in the lumber industry are cut in much longer lengths, consistent with their desired end use, and are piled in a single section on a logging truck with their lengths parallel to the length of the bed of the truck.

In the case of pulp wood logs, the bed of the truck is equipped with upstanding barriers, placed transversely to the truck bed, which serve to separate each section of logs, and to prevent the intermingling of logs from adjacent sections. Such barriers conventionally comprise two upstanding members secured to opposite sides of the truck bed and a cross-member connecting the tops of the upstanding members. The size of each section of logs is predetermined to hold that number of logs which may be easily accommodated by mechanical gripping and lifting devices utilized to remove the logs from the truck at the pulp mill site. In the case of lumber logs, the bed of the truck is equipped with a number of freely upstanding posts mounted to and located along each side of the bed of the truck, which posts serve to prevent the logs from rolling off the sides of the truck.

In each of the two types of transportation operations described above, it is well known to utilize either "chain and binder" or "cable and winch" systems to further protect against the possibility of logs falling from the bed of the truck during transportation. For pulp wood logs, one end of a chain is generally secured to the cab of the truck, or to the upstanding barrier immediately rearwardly adjacent the cab, by suitable interconnecting means, at a point intermediate the width of the load, and the remainder of the chain placed over the sections along the length of the truck bed. The second end of the chain is then immobilized at the rear of the truck bed and the chain tightened by a suitable over-center binder. For lumber logs, a chain is wrapped about the entire pile of logs at a point intermediate their length and the chain secured and tightened by a suitable over-center binder. As will be readily understood, in each operation, the chain is placed transverse to the length of the logs and the chain is tightened by the binder so as to maintain as tight a hold on the logs as possible.

For the purpose of simplicity in the following description slippage of logs in a direction parallel to their length will be termed longitudinal slippage and slippage in a direction perpendicular to their length will be termed lateral slippage.

Illustrative of "chain and binder" securing mechanisms are those disclosed in U.S. Pat. Nos. 448,862 to Johnson and in 3,271,007 to Ratcliff. Each of these patents discloses an apparatus for binding the logs to the truck bed in which an over-center load binder is used to tighten a chain about a load of logs in order to prevent slippage. Each patent discloses the use of a conventional chain comprising individual links in combination with an over-center load binder. A third example of a load binding apparatus embodying an over-center load binder is disclosed in U.S. Pat. No. 2,919,895 to Johnson which shows the binder mounted to the bed of the truck at the rear end thereof, in order that an operator may be safely out of the path of logs which may be displaced during operation of the binder.

While each apparatus for stabilizing logs described hereinabove, and similar systems in conventional use, the proven generally satisfactory, each suffers from at least two major disadvantages. The first such disadvantage stems from the fact that, since the chain or cable used to bind the logs depends only on the tightness or tension exerted on the pile of logs to hold the logs securely, constant jarring over long haul distances may cause the logs to pack more tightly together and may thereby tend to slacken the tension of the chain and loosen the load. The second such disadvantage is that, although lateral slippage is relatively well prevented by a conventional chain and binder apparatus due to its orientation transverse to the length of the logs, such systems offer a great deal less protection against longitudinal slippage of the logs, especially when the load is subjected to sudden forces such as frequently occur in a traffic accident. Indeed, the problem of slippage is of such magnitude that the State of Alabama has passed legislation requiring that pulp wood trucks have their load secured by a minimum of two chains or cables rather than one.

There is thus a need for a log stabilizing apparatus which will more securely hold logs with respect to both lateral and longitudinal slippage despite minor decreases in chain or cable tension which occur during transportation.

SUMMARY

It has now been discovered that a log binding chain which imparts greater stability with respect to lateral and longitudinal slippage than the conventional chain may be constructed from a plurality of sequentially connected links, each individual link being capable to penetrating the surface of the logs. In addition, such a chain, in combination with an over-center load binder attached to the chain and having a first end which is adapted to be releasably attached to one of the links, may be used to increase the log penetrating ability of the chain. A link, in the chain fabricated in accordance with the invention, is generally similar to a conventional link in that it is generally oval shaped, having two side portions and two end portions and a central opening therebetween. The link of this invention, however, additionally includes laterally directed extensions, each having log penetrating outer ends, one such extension extending outwardly from each of the two sides of the link and in the plane of the link. In addition, a bar or dowel having a length approximately equal to the distance between the outer ends of the lateral extensions on either side of the link, is placed through the central opening of the link, normal to the plane of the link, and is secured therein so as to extend substantially equidistantly above and below the link plane by welding or the like. Both ends of the bar or dowel are sharpened or beveled in order to be adapted to penetrate the bark on the surface of the log. The over-center binder for the chain may have at least one end which comprises a bifurcated hook which is capable of engaging the bar or dowel of an individual link and of accepting a portion of one side of that link between its individual bifurcations. In addition the length of the space between the bifurcations is selected such that the hook will allow a second dowel to extend therethrough.

BRIEF DESCRIPTION OF THE DRAWINGS

The novel features which are believed to be characteristic of this invention are set forth with particularity in the appended claims. The invention, itself, however, both as to its organization and method of operation, together with further objects and advantages thereof, may best be understood by reference to the following description taken in connection with the accompanying drawings, in which:

FIG. 1 is a side elevational view of a chain constructed in accordance with the invention;

FIG. 2 is an elevational view of a binder constructed in accordance with the invention;

FIG. 3 is a sectional view of the binder apparatus of FIG. 2 taken along line 3—3 of FIG. 2;

FIG. 4 is a perspective view of a truck on which is supported a load of logs longitudinally oriented with respect to the truck bed and bound by a chain-binder apparatus constructed in accordance with the invention; and FIG. 5 is a perspective view on an expanded scale of portions of two individual logs and a bifurcated hook of the load binder engaged about two of the links of the chain.

DESCRIPTION OF THE PREFERRED EMBODIMENT

Referring to FIG. 1 there is seen a portion of a length of log binding chain constructed in accordance with the invention, indicated generally at 10. Chain 10 is fabricated from individual links 12, each of which has a roughly elongated oval shape, having two continuous opposed side leg portions 14, two rounded end portions 16 and a central opening 18 therebetween. The outwardly facing portion of each of the two sides 14 is provided with a rigid pyramidal extension 20. Thus, each individual link will have two outwardly directed pyramidal extensions 20, one on either side of the link which are capable of penetrating and holding a log or other penetratable material. In addition, since the planes of alternating links in the chain are approximately normal to each other, the apices of the pyramidal extensions 20 will lie in planes which are perpendicular to each other in each alternating link.

An elongated member such as a bar or dowel 22, of a length approximately equal to the distance between the apices of the pyramidal shaped extensions 20 of an individual link, is inserted through the central opening 18, normal to the plane of the link in such a way as to extend equidistantly on either side of that plane. The ends 24 of bar or dowel 22 are beveled, or otherwise sharpened, in order that they, like the apices of the pyramidal extensions, may be capable of penetrating and holding logs or other similarly penetrating items. Dowel 22 may be welded to the link in central hollow 18, or alternatively, the entire link may be forged or cast having dowel 22 as an integral part thereof.

Referring to FIGS. 2 and 3 there is seen a binder 26 constructed in accordance with the preferred embodiment of the invention and compatible with the chain shown in FIG. 1. Binder 26 is equipped with a first bifurcated hook 28, having an interior width between the indivual bifucations of greater than the thickness of the link but less than the length of the dowel 22. Bifurcated hook end 28 has a base portion 30 having an eyelet hole 32 therein, and has hook tips 34, rounded hook exterior 36, and a rounded hook interior 38. Hook interior 38 is sized to be slightly in excess of the thickness or diameter of bar or dowel 22. In addition, the interior length of the bifurcation, i.e., the distance between hook interior 38 and that point in base 30 at which the two individual bifurcations of hook 28 coalesce, is preselected to be equal to the sum of the thickness of an elongated member plus the length of a link minus twice the thickness of a link in order that the hook end may be capable of accepting portions of two adjacent links as further described below.

First bifurcated hook end 28 may be pivotally connected to a first clevis 40. As shown in FIGS. 2 and 3, a first conventional link 44 and a first conventional eye bolt 46 may be used to connect hook 28 to clevis 40 in order to impart a greater amount of independent movement therebetween. Finally, first clevis 40 is pivotally attached to a binder lever portion 42 adjacent one end of said lever portion.

The binder is attached to a link of the chain by a second end which preferably comprises a second clevis 48 pivotally attached to lever 42 at a point spaced from the point of connection of first clevis 40, second eyebolt 50, and second conventional link 52, and a second bifurcated hook end 54.

The size and shape of lever 42 as well as the relative positions of the pivotable connections between the lever and first clevis 40 and the lever and second clevis 48 are preselected in such a way that the mechanism may function as an over-center binder.

Referring to FIG. 4, there is seen a logging truck 56 on which a number of logs 58 are placed longitudinally along the bed of the truck as is conventional practice in the lumber operation. The logs are stabilized both with respect to lateral movement and with respect to longitudinal movement by two stabilizing chain-binder arrangements 60 constructed in accordance with one embodiment of the invention. Each such arrangement 60 may comprise a length of a chain constructed similarly to that shown in FIG. 1, in combination with a binder constructed similarly to that shown in FIGS. 2 and 3. Upon loading the truck with a number of logs 58 the chain is wrapped about the load of logs and the chain ends are brought adjacent to each other.

Binder 26 is attached to one of the links of the chain adjacent one of the ends of the chain by second bifurcated hook end 54 or other suitable attaching means. The end of the chain opposite that at which the binder is attached is engaged in first bifurcated hook end 28, as further described below, such that the chain is drawn snugly about the logs with the binder in the "open" position. Lever portion 42 is then pivoted to the "closed" position tightening the chain and causing penetration of the logs by the sharpened portions of the links. By virtue of the over-center binder used, the lever will resist opening and will thereby tend to maintain the logs in position.

Referring to FIG. 5 there is seen the method of connecting first bifurcated hook end to an indivudual link in the chain in order to form a secure connection therebetween. First bifurcated hook end 28 is placed such that hook interior 38 partially encircles a dowel 22, with the link to which dowel 22 is attached, passing upwardly between the two bifurcations in order to expose the apices of pyramidal extensions 20 above and below the profile of the bifurcation. As is also disclosed in FIG. 5, the next link closer to base portion 30 of bifurcated hook end 28 will lie beneath bifurcated hook end 28, approximately parallel thereto, and will have the dowel 22 associated therewith projecting between the two bifurcated hooks exposing its sharpened ends above and below the profile of the bifurcations at the approximate height of the pyramidal spikes 20 of the link engaged by hook interior 38.

As will be appreciated by those skilled in the art, the tightening of the chain through the use of the over-center binder described above will cause the apices of pyramidal extensions 20 and the sharpened ends of dowels 22 to penetrate the bark of those logs 58 which are atop the pile transported on the truck, thereby stabilizing those logs against any lateral or longitudinal shifting. In addition, even those links of the chain which are utilized as connecting links for the binder, nonetheless will have their penetrating edges exposed to the logs thereby increasing the efficiency of the binding apparatus.

As will also be appreciated by those skilled in the art, the use of conventional link 44 and eyebolt 46 to connect first bifurcated hook 28 to first clevis 40 is not required for the operability of the apparatus, but is done only in the preferred embodiment to impart the ability for independent relative movement between clevis and hook. Furthermore, binder 26 need not be fabricated having two bifurcated hook ends, but rather may have second conventional link 52 and second hook end 54 removed and have second eyebolt 50 permanently linked directly to a link of the chain adjacent one end of the chain. In addition, as will also be readily understood by those skilled in the art, the chain and binder apparatus of this invention is not limited to use on logs placed longitudinally on a truck bed, but may be utilized with equal effectiveness on loads of pulp wood logs which logs are placed transversely on the truck bed. In conjunction with such use, it may be preferred to attach a pivotable interconnecting means to the end of the chain opposite that of which the binder is attached, which means are mountable to one of the ends of the truck bed.

Finally, while log transportation by truck has been used to demonstrate the utility of the invention, the chain and binder apparatus disclosed herein has equal applicability to the transportation of logs on railroad cars or any other transport platform, the use of which involves a significant danger from log slippage.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A chain for binding logs on a transport platform comprising a plurality of sequentially connected links, each said link comprising:
   a. a generally planar loop having two opposed end portions adapted to interconnect other links and two continuous, spaced apart opposed side leg portions integral with said end portions and defining a central opening therebetween;
   b. two rigid extensions, one said extension being integral with each respective said leg portion of said loop and extending laterally outwardly therefrom in the plane of said loop, each said extension having a sharpened outwardly terminal and;
   c. an elongated bar member extending through said central opening and welded to said legs, said bar member being oriented to extend in a direction normal to the plane of said loop and having straight body portions extending equidistantly above and below said plane outwardly beyond the upper and lower edges of said leg portions.

2. The chain as set forth in claim 1 wherein the rigid extensions are pyramidal and extend outwardly to a sharp apex.

3. The chain as set forth in claim 1 additionally comprising interconnecting means, including a universally pivotal portion and a portion attachably engaging said body portions of one link of said chain.

4. The combination according to claim 1 wherein each said loop is elongated and of substantially oval shape.

5. The chain as set forth in claim 1 wherein the body portions of said elongated bar members terminate outwardly in sharp beveled ends.

6. The chain as set forth in claim 5 wherein the length of said elongated member of each link between said beveled ends thereof is approximately equal to the distance between said terminal ends of said two rigid extensions of the leg portions of the link to which said member is welded.

7. In combination, a chain comprising a plurality of sequentially interconnected generally planar links having central openings, each said link having two pyramidal extensions projecting laterally outwardly from respective opposite lateral side legs of said link centrally of said sides of having an elongated bar member with sharpened ends extending through said central opening between and welded to the opposite side legs thereof, said bar member extending normal to the plane of the link and having portions extending equidistantly above and below said plane and beyond the upper and lower edges of said side legs, and in overcenter tightening binder having a first end releasably engageable with said portions of said bar member of a link of said chain, said first end comprising a first base portion and a first rigid bifurcated hook portion rigidly mounted to said first base portion, said first bifurcated hook portion having a first pair of hooks in parallel spaced relation, each of said hooks in said first pair having an inner hook diameter approximately equal to the thickness of said portions of one of said elongated members, said first pair of hooks having an interior distance therebetween of from about the thickness of one of said links to about the length of said elongated member and having an interior length therealong of not less than about the sum of the thickness of an elongated member plus the length of one of said links minus twice the thickness of one of said links, and said binder having a second end pivotally mounted to a link in said chain intermediate the length of said chain.

8. The combination as set forth in claim 7 wherein said second end comprises a second base portion and a second rigid bifurcated hook portion rigidly mounted to said second base portion, said second bifurcated hook portion having a second pair of hooks in parallel spaced relation, each of said hooks in said second pair having an inner hook diameter approximately equal to the thickness of said portions of one of said elongated members, said second pair of hooks having an interior distance therebetween of from about the thickness of one of said links to about the length of said elongated member and having an interior length therealong of not less than about the sum of the thickness of an elongated member plus the length of one of said links minus twice the thickness of one of said links.

* * * * *